United States Patent [19]

Wakui et al.

[11] Patent Number: 4,935,772
[45] Date of Patent: Jun. 19, 1990

[54] METHOD OF AND APPARATUS FOR CONTROLLING PHOTOGRAPHIC PRINTING LAMP LIGHT OUTPUT

[75] Inventors: Hiromitsu Wakui; Fumiaki Ihara, both of Kanagawa, Japan

[73] Assignee: Fuji Photo Film Co., Ltd., Kanagawa, Japan

[21] Appl. No.: 363,823

[22] Filed: Jun. 9, 1989

[30] Foreign Application Priority Data

Jun. 10, 1988 [JP] Japan .................................. 63-142943

[51] Int. Cl.$^5$ ............................................. G03B 27/72
[52] U.S. Cl. ......................................... 355/68; 355/69
[58] Field of Search ............................ 355/68, 69, 77; 315/150, 151

[56] References Cited

U.S. PATENT DOCUMENTS 4,124,294  11/1978  Nakamura ............................ 355/68
4,463,284  7/1984   Tamura et al. ..................... 355/68 X
4,645,982  2/1987   Takayanagi ........................ 355/69 X Primary Examiner—L. T. Hix
Assistant Examiner—D. Rutledge
Attorney, Agent, or Firm—Sughrue, Mion, Zinn, Macpeak & Seas

[57] ABSTRACT

The power supplied to a new printing lamp which replaces an old lamp is set automatically. The light output of the new printing lamp is measured with an exposure control sensor while the power supplied to the new printing lamp is changed in predetermined step units under control of CPU. The power supplied to the new printing lamp is fixed when the measured light amount coincides with a predetermined reference light amount. The automatically fixed lamp power is stored in a memory, and is read out therefrom to drive the new printing lamp when making a photographic print, to ensure the same light output as that of the old printing lamp.

7 Claims, 3 Drawing Sheets

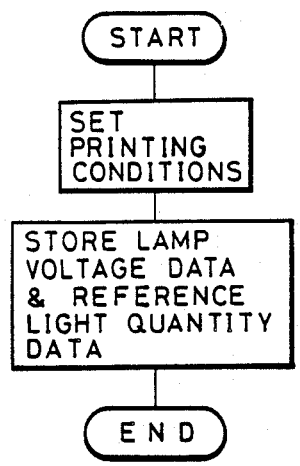
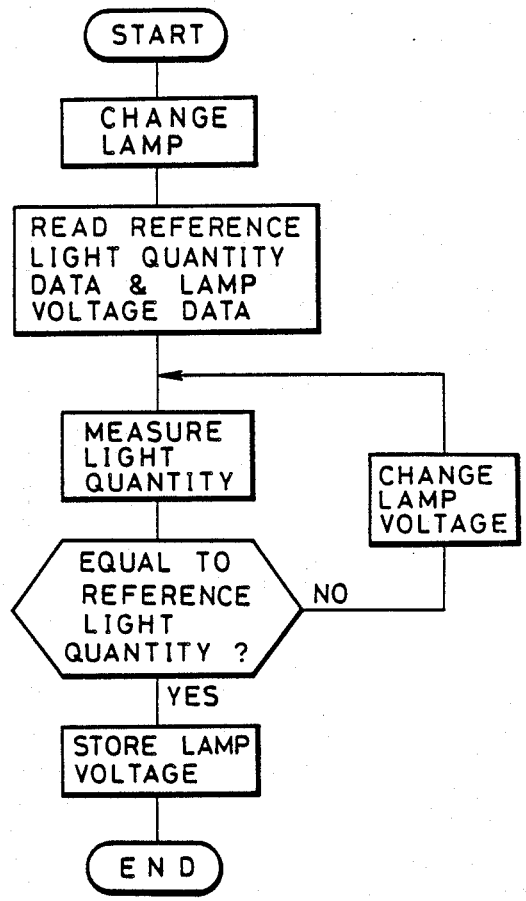
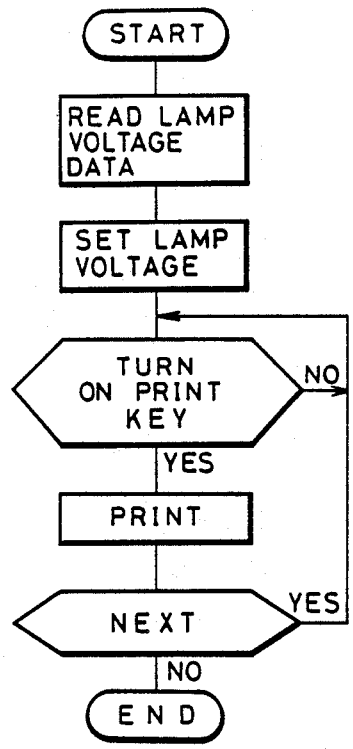

METHOD OF AND APPARATUS FOR CONTROLLING PHOTOGRAPHIC PRINTING LAMP LIGHT OUTPUT

BACKGROUND OF THE INVENTION

The present invention relates to a method of and apparatus for controlling the light output of a printing lamp used in a photographic printer.

To make photographic prints having proper density and color balance, a conventional photographic printer uses sensors to measure an original illuminated by a printing lamp to detect an amount of light passed through the original. Insertion of color correction filters into the optical path is regulated in accordance with the measured light values. The sensors include three sensors for photometry of average transmittance densities of red, green and blue colors, and an image sensor for photometry of the density at each point of the image. A color image sensor also is known which measures the densities of red, green and blue colors at each point of an image, the average transmittance density of each color then being calculated by using the densities at respective points.

The light emission quantity of a printing lamp generally is determined based on an exposure time sensor sensitivities and the like. A halogen lamp used as the printing lamp normally is excited at about AC 65 V r.m.s. Conventionally, an operator manually turns a voltage adjustor while monitoring a voltage meter to obtain such a lamp voltage.

The light emission quantity varies with each printing lamp. In replacing a printing lamp with a new one, not only the lamp voltage setting but also the print condition setting (determining parameters of an exposure amount calculating equation) has been carried out in order to ensure the same finished print quality as that achieved with the old printing lamp. The conventional lamp replacement accompanying print condition setting thus has been troublesome and time consuming.

SUMMARY OF THE INVENTION

In view of the foregoing, it is a principal object of the present invention to provide a method of and apparatus for controlling the light output of a printing lamp so as to regulate the lamp power automatically upon lamp replacement.

It is another object of the present invention to provide a method of and apparatus for controlling the light output of a printing lamp, wherein print condition adjustment is not required at the time of lamp replacement.

The above and other objects of the present invention can be achieved so that the light output of a new printing lamp which replaces an old one is measured with an exposure control sensor, and if the light output is not equal to a reference light amount previously stored, the lamp power is adjusted to obtain the same light amount. This lamp power is stored and used to drive the printing lamp in making photographic prints.

The reference light amount may be determined at the time of designing a photographic printer. However, in consideration of a change of sensor characteristics over time, it is preferable to determine and store it at the time of print condition setting.

According to the present invention, it is not necessary for an operator to turn a voltage controller to adjust lamp voltage, and to set print conditions at the time of lamp replacement. Further, since a light output which is the same as that before replacement with an old lamp is ensured, it is possible to avoid a change in quality of finished prints.

BRIEF DESCRIPTION OF THE DRAWINGS

The above and other objects, advantages, and features of the present invention will become more apparent from the following detailed description when read in connection with the accompanying drawings, in which:

FIG. 2 is a flow chart illustrating the operation of setting print conditions;

FIG. 3 is a flow chart illustrating the operation of making photographic prints;

FIG. 4 is a flow chart illustrating the operation of replacing a printing lamp.

DETAILED DESCRIPTION OF THE PREFERRED EMBODIMENT

Figure 1:
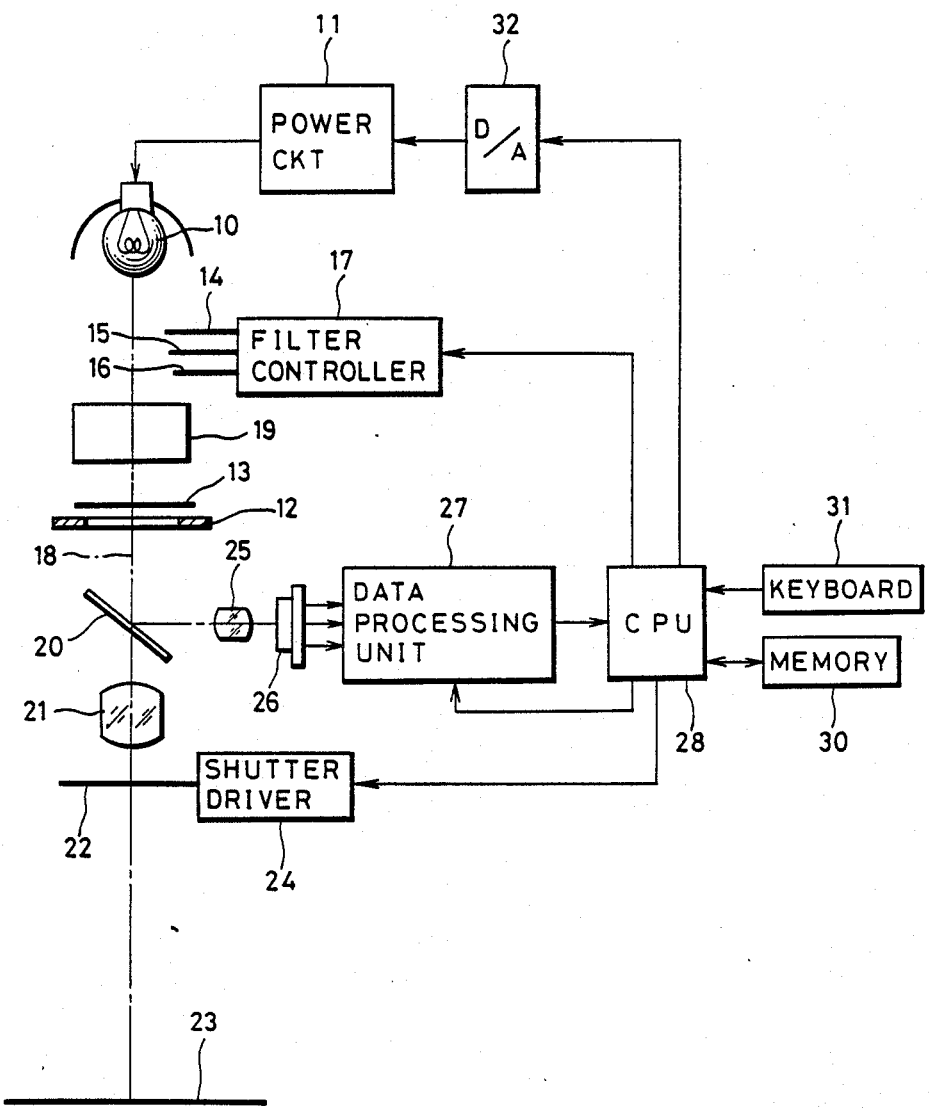
FIG. 1 is a schematic diagram showing a photographic printer embodying the present invention.

Referring to FIG. 1, a halogen lamp 10 used as a printing lamp is powered by a power circuit 11 while controlling the light output thereof. Light emitted from the lamp 10 is applied to an original 13, such as a negative film, which is held in position with a film carrier 12. Between the lamp 10 and film carrier 12, there are disposed a yellow filter 14, a magenta filter 15, and a cyan filter 16, all of which have their degree of insertion into an optical path 18 controlled by a filter controller 17 to adjust the components and intensities of red, green and blue colors. Light passed through these color correction filters 14 to 16 is diffused sufficiently in a mixing box 19.

A half mirror 20, printing lens 21 and shutter 22 are disposed under the film carrier 12. While the shutter 22 is held open by a shutter driver 24, the negative image on the negative film 13 is projected upon a color photographic paper 23 through the printing lens 21.

Light reflected laterally by the half mirror 20 is made incident, via a lens 25, on a color image sensor 26, which may be a MOS type color image sensor, for example. The color image sensor 26 photoelectrically converts three colors at each point of the negative image so as to output, in time sequence, color separated electric signals. Each time sequential color signal is subjected to logarithmic conversion, A/D conversion, and calculation of exposure amount at a data processing unit 27.

To calculate exposure amount, first an average transmittance density (e.g., LATD) of the whole area of an image is obtained by adding together the output values at respective pixels from the color image sensor 26, and the average transmittance densities at each point and at a specific area of the image are obtained. Then, by substituting these characteristic density values into an exposure amount calculation equation, the exposure amount for each color can be obtained. In accordance with the obtained exposure amounts which are taken into CPU 28, the color correction filters 14 to 16 are moved to proper positions by means of the filter controller 17. The data processing unit 27 calculates the average transmittance densities while the light amount of the lamp 10 is adjusted, and sends the calculated results to CPU 28 as light amount data.

A memory 30 stores therein a printing procedure, fixed data, and the like, as well as reference light amount data and lamp voltage data. A keyboard 31 is used for inputting operation commands, data and the like. When making prints, CPU 28 causes the lamp voltage data to be read from the memory and sent to a D/A converter 32 which converts it into an analog signal. The analog signal sent to the power circuit 11 controls the light amount of the lamp 10.

The operation of the above-described embodiment will be described with reference to FIGS. 2 to 4. Referring to the flow chart of FIG. 2 illustrating the operation of setting print conditions, the color correction filters 14 to 16 are set at the standard position. Then, the outputs from the color image sensor 26 are checked to adjust the light amount of the lamp to obtain a proper dynamic range. This light amount adjustment can be effected by changing the lamp voltage data from the keyboard. The lamp voltage data determined at the time of print condition setting are stored in the memory 30. In addition, the average transmittance density for the whole area of an image for each color is measured with the color image sensor 26. An average value (grey average transmittance density) of the average transmittance densities of three colors is calculated, and the calculated result is stored in the memory 30 as the reference light amount data.

In making prints as shown in the flow chart of FIG. 3, the lamp voltage data are read from the memory 30, and are sent to the D/A converter 32, where the data are converted into an analog signal. The analog signal supplied to the power circuit 11 controls the power of the lamp 10 so that the light amount of the lamp 10 is set automatically at the same value as that at the time of setting print conditions.

In making photographic prints, a print key on the keyboard 31 is operated in a well known manner after a negative film 13 has been set on the film carrier 12. Upon actuation of the print key, the negative image is measured while the color correction filters 14 to 16 are set at the standard position. Three colors at each point of the negative image are measured with the color image sensor 26. The characteristic values such as an LATD, average transmittance density at a specific area, maximum and minimum densities and the like are derived from the measured values at respective points. These characteristic values are substituted into a well known exposure amount calculation equation to calculate the exposure amount for each color. In accordance with the obtained exposure amounts, CPU 28 causes the filter controller 17 to insert the color correction filters 14 to 16 into the optical path 18 at proper positions. After properly inserting the color correction filters 14 to 16, the negative image is printed on the color photographic paper 23 via the printing lens 21 while the shutter 22 is held open by the shutter driver 24.

If the lamp 10 breaks during print making, a new printing lamp replaces it. After replacing the lamp, the reference light amount data and lamp voltage data stored in the memory 30 are read out therefrom, as shown in the flow chart of FIG. 4. The new lamp is energized in accordance with the read-out lamp voltage data. After setting the color correction filters 14 to 16 at the standard position, the light output of the new lamp is measured with the color image sensor 26.

The CPU 28 checks whether the measured light amount is equal to the reference light amount data. If not, the lamp voltage is increased or decreased in units of a predetermined step, depending upon the difference between the measured light amount data and reference light amount data. After changing the lamp voltage, the light amount of the lamp is measured again to compare the result with the reference light amount data.

The above operations are repeated until the light amount data is the same as the reference light amount data determined at the setting of print conditions.

Upon completion of the light amount adjustment, the newly determined lamp voltage is stored in the memory 30 so that the lamp is driven at this new lamp voltage until the next lamp replacement or a new print condition setting. Consequently, it is not necessary to reset printing conditions at the time of lamp replacement. Further, since the same light amount as that at the print condition setting can be ensured, the quality of finished photographic prints can be maintained constant.

Figure 5:
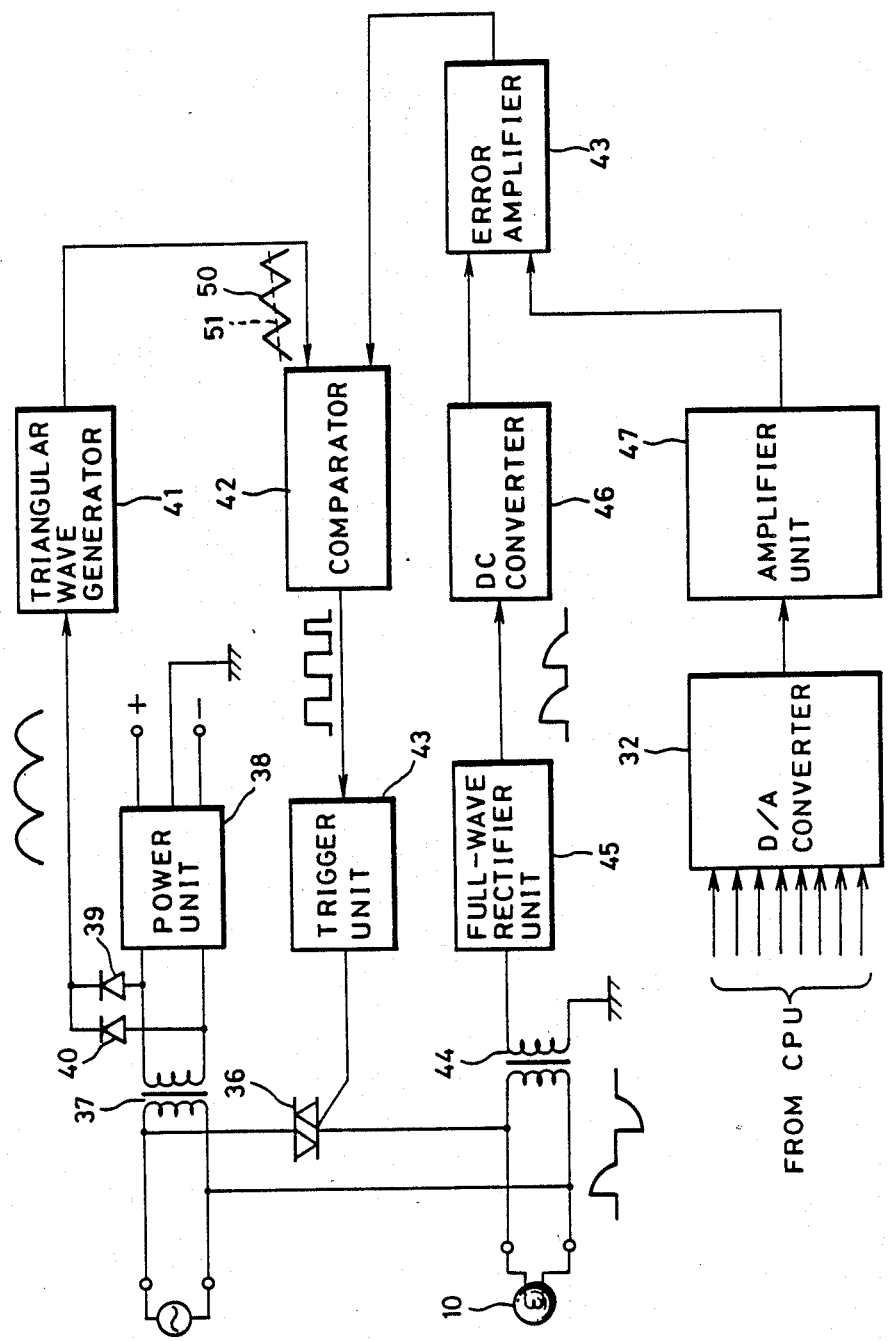
FIG. 5 is a block diagram of one example of a power circuit according to the invention.

FIG. 5 is a block diagram showing an example of a power circuit with feedback control. The lamp 10 is connected via a triac 36 to an AC power supply (100 V). The power supplied to the lamp 10 is regulated by turning on the triac 36 for a predetermined duration at timings synchronous with the period of the AC power supply. The AC power supply is connected to a transformer 37 with a power unit 38 from which powers of various voltages are supplied to associated control circuits. AC power from the secondary winding of the transformer 37 is full-wave rectified by diodes 39 and 40 and is supplied to a triangular wave generator 41 to generate a triangular waveform signal 50. The triangular waveform signal 50 is compared with an output signal 51 from an error amplifier 43 at a comparator 42. The comparator 42 outputs a high level (H) signal when both the signals are equal to each other, and a low level (L) signal otherwise. These H and L signals from the comparator 42 control the turning on and off of the triac 36.

In order to manage properly the power control by the triac 36, there are provided a transformer 44, full-wave rectifier unit 45 and DC converter 46. The transformer 44 connected in parallel with the lamp 10 steps down the lamp voltage which is rectified by the full-wave rectifier unit 45, converted into a DC voltage by the DC converter 46, and applied to one input of the error amplifier 43.

In the meantime, the lamp voltage data read out from the memory 30 under control of CPU 28 are converted to an analog signal at the D/A converter 32. The analog signal is amplified by an amplifier 47 and is applied to the other input of the error amplifier 43 which outputs a signal 51 corresponding to a difference between the output voltages from the amplifier 47 and DC converter 46.

The above embodiment has been described in the context of a subtractive mixture type photographic printer. However, an additive mixture type photographic printer may be used which performs three color sequential plane exposure by using red, green and blue filters and a turret formed with constant pitch light measuring openings while rotating the latter. Further, photometry may be conducted using an ND filter having its density near the base density of a negative film, or photometry may be conducted while throttling the light amount by inserting a part of the light measuring opening of the turret into the optical path.

Finally, while the invention has been described with reference to a preferred embodiment, various alterations and modifications within the scope and spirit of this invention will be apparent to those of working skill in this technical field. Thus, the invention should be considered as limited only by the scope of the appended claims.

What is claimed is:

1. In the making of photographic prints, a method of controlling the light output of printing lamps, comprising the steps of:
   (i) determining reference light amount data indicating a reference light amount;
   (ii) automatically setting the power of a new printing lamp which replaces an old printing lamp;
   (iii) measuring the light output of said new printing lamp with an exposure control sensor;
   (iv) if the light output of said new printing lamp is not equal to said reference light amount, adjusting said power of said new printing lamp in predetermined steps;
   (v) repeating said steps (ii)-(iv) until the light output of said new printing lamp is equal to said reference light amount;
   (vi) storing data regarding the power of said new printing lamp in a memory; and
   (vii) in making said photographic prints, driving said new printing lamp in accordance with said data regarding said power of said new printing lamp.

2. A method according to claim 1, wherein said step (i) is performed at the time of setting print conditions for making said photographic prints.

3. A method according to claim 2, wherein said power of said new printing lamp is represented by a lamp voltage.

4. In an apparatus for making photographic prints, apparatus for automatically controlling the light output of a printing lamp, said automatic control comprising:
   a lamp power circuit for controlling the light output of said printing lamp in accordance with lamp power data;
   a first memory for storing reference light amount data determined at the time of setting print conditions for said apparatus;
   a sensor for measuring the light output of said printing lamp and providing measured light data accordingly;
   means for comparing the measured light data with the reference light amount data read from said first memory while shifting by predetermined step units the power data of a new printing lamp which replaces an old printing lamp, and obtaining power data of the new printing lamp when both the measured light data and the reference light amount data are the same; and
   a second memory for storing said power data of the new printing lamp when both the measured light data and the reference light amount data are the same, said power data being read out from said second memory and sent to said lamp power circuit for making said photographic prints.

5. An automatic control apparatus according to claim 4, wherein said lamp power is represented by a lamp voltage.

6. An automatic control apparatus according to claim 5, wherein said lamp power circuit comprises:
   an AC power supply for supplying AC power to said printing lamp;
   switching means connected between said AC power supply and said printing lamp;
   means for converting a fraction of said AC power passed through said switching means into a DC signal;
   means for converting said lamp voltage data read out from said second memory into an analog signal;
   means for detecting a difference between said DC signal and said analog signal and generating a corresponding difference signal accordingly;
   means for full-wave rectifying a fraction of said AC power from said AC power supply and converting said fraction of said AC power into a triangular waveform signal;
   means for judging whether said triangular waveform signal is larger than said difference signal and providing an output accordingly; and
   means for turning said switching means on and off in accordance with said output of said judging means.

7. An apparatus according to claim 6, wherein said switching means comprises a triac.

* * * * *